Patented Aug. 5, 1952

2,606,197

UNITED STATES PATENT OFFICE 2,606,197

HALOSTEROID ACID DERIVATIVES AND PREPARATION OF SAME

Romeo B. Wagner, State College, Pa., and James A. Moore, Detroit, Mich., assignors to Parke, Davis & Company, Detroit, Mich., a corporation of Michigan No Drawing. Application December 3, 1949, Serial No. 131,055

8 Claims. (Cl. 260—397.1)

This invention relates to steroid acids and their ester derivatives and to the preparation of same. More particularly, the invention relates to steroid acids and esters of the pregnene series characterized by having a double bond at $C_{17}$—$C_{20}$, a bromine atom on $C_{20}$ and carboxy or carboalkoxy at the 21 position. These 20-bromo$\Delta^{17}$-pregnen-21-oic acid products can be represented by the following formula:

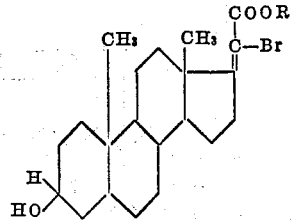

where R is H or a lower alkyl radical.

In accordance with the invention, the 20-bromo-$\Delta^{17}$-pregnen-21-oic acids having the above formula are prepared by reacting 17,21,21-tribrominated pregnane compounds of the formula:

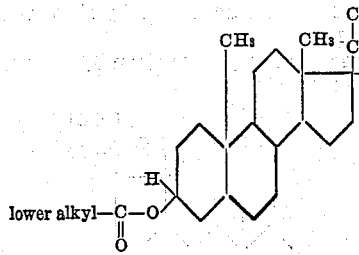

with an alkali metal hydroxide dissolved in a lower aliphatic alcohol containing water in amounts ranging from 5% to 50%. The reaction takes place smoothly in a short period of time, the product is easily isolated and the yields range from 50–70%. The usual temperature for the reaction is between 70 and 110° C. but preferably about 85 to 95° C. Diagrammatically this transformation may be illustrated as follows:

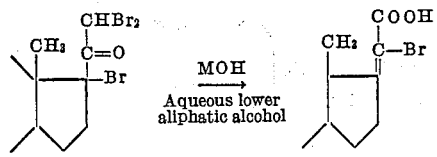

where M is an alkali metal.

The corresponding ester products are prepared by reacting the 20-bromo-$\Delta^{17}$-pregnen-21-oic acid compounds with a diazoalkane containing not more than three carbon atoms. The reaction is carried out at a temperature below 50° C. and in an inert organic solvent such as a lower aliphatic alcohol, a lower aliphatic ether, a cyclic ether, a benzene hydrocarbon or a mixture of the same.

The products of the invention are useful intermediates for the preparation of other organic compounds and in particular for the preparation of steroids similar in structure to those found in the adrenal cortex.

The following examples are illustrative.

Example 1

3.0 g. of 17,21,21-tribromopregnan-3($\beta$)-ol-20-one acetate in 600 cc. of boiling ethanol is added to 12 g. of potassium hydroxide dissolved in 40 cc. of aqueous ethanol. The resulting solution is refluxed for two hours and then concentrated until solid begins to separate. Water is added and the mixture is extracted with several portions of ether. The aqueous layer is treated with excess dilute sulfuric acid and the free acid which separates is extracted with ether. After washing, drying and concentrating the ether extract, a crystalline mass is obtained. Recrystallization from methanol gives glistening prisms of 20-bromo-3($\beta$)-hydroxy-$\Delta^{17}$-pregnene-21-oic acid which melt at 271–273° C. with decomposition, $(\alpha)_D^{25}=+41°$ (C=1.608 in dioxane). This product has the formula,

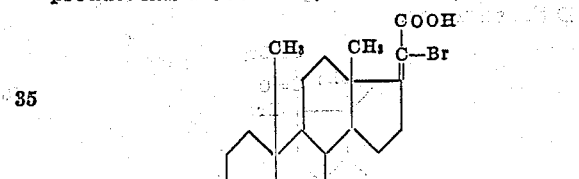

Example 2

400 mg. of the above bromopregnenoic acid in 15 cc. of dioxane and 15 cc. of ether is treated with an excess of diazo methane in ether. After standing for one-half hour at 25° C., the excess diazo methane is destroyed with acetic acid and the solvents are removed by concentration in vacuo. The residue is dissolved in ether and the solution washed with dilute potassium hydroxide and water. The ethereal solution is dried and concentrated to yield long fine needles of methyl 20-bromo-3($\beta$)-hydroxy-$\Delta^{17}$-pregnen-21-oate. Upon recrystallization from methanol the material melts at 152–3° C., $(\alpha)_D^{25}+37°$ (C=2.40 in chloroform). This compound has the formula,

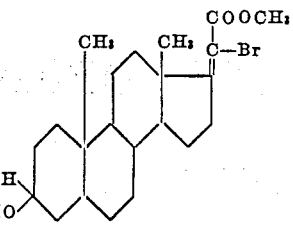

The 17,21,21-tribrominated pregnane compounds used as starting materials in the practice of the invention may be prepared by the methods described and claimed in our copending application Serial No. 131,054, filed under even date herewith. Said methods comprise bromination at a temperature above 50° C. of the corresponding pregnanolones.

What we claim is:
1. Process for the preparation of a steroid acid having at ring D the structure,

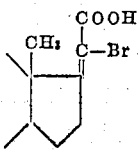

which comprises reacting a steroid having at ring D the structure,

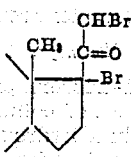

with an alkali metal hydroxide dissolved in a lower aliphatic alcohol containing water in amounts ranging from 5% to 50% by weight.

2. Process for the preparation of an ester of a steroid acid having at ring D the structure,

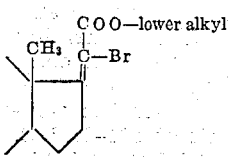

which comprises reacting a steroid having at ring D the structure,

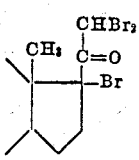

with an alkali metal hydroxide dissolved in a lower aliphatic alcohol containing water in amounts ranging from 5% to 50% by weight, and further reacting the acid thereby obtained with a diazoalkane.

3. Process for the preparation of a steroid acid of the formula,

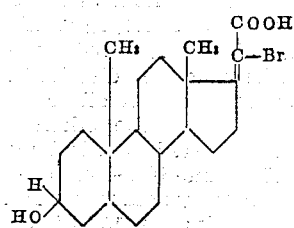

which comprises reacting a steroid of the formula,

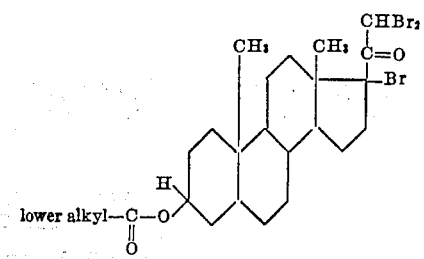

with an alkali metal hydroxide dissolved in a lower aliphatic alcohol containing water in amounts ranging from 5% to 50% by weight.

4. Process for the preparation of an ester of a steroid acid of the formula,

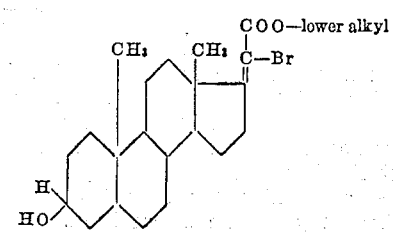

which comprises reacting a steroid of the formula,

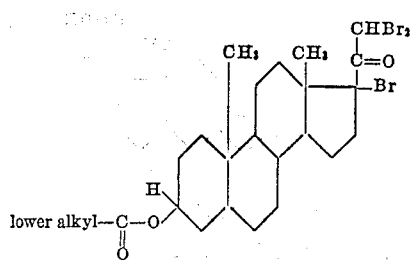

with an alkali metal hydroxide dissolved in a lower aliphatic alcohol containing water in amounts ranging from 5% to 50% by weight and further reacting the acid thereby obtained with a diazoalkane.

5. Process for the preparation of a steroid acid having the formula,

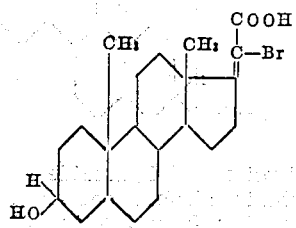

which comprises reacting a steroid having the formula,

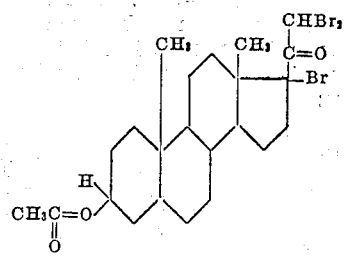

with an alkali metal hydroxide dissolved in a lower aliphatic alcohol containing water in amounts ranging from 5% to 50% by weight.

6. A compound of the formula,
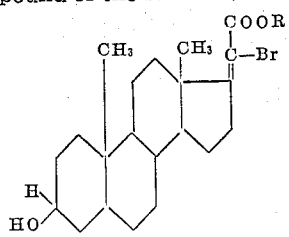
where R is a lower alkyl radical.
7. A compound of the formula,
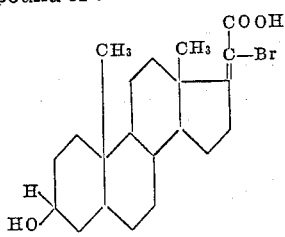
8. A compound of the formula,
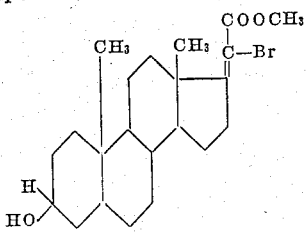
ROMEO B. WAGNER.
JAMES A. MOORE.
REFERENCES CITED
The following references are of record in the file of this patent:
UNITED STATES PATENTS
| Number | Name | Date |
|---|---|---|
| 2,359,773 | Marker | Oct. 10, 1944 |